US009280458B2

(12) United States Patent
Durrant

(10) Patent No.: US 9,280,458 B2
(45) Date of Patent: Mar. 8, 2016

(54) RECLAIMING MEMORY PAGES IN A COMPUTING SYSTEM HOSTING A SET OF VIRTUAL MACHINES

(75) Inventor: Paul Durrant, Royston (GB)

(73) Assignee: Citrix Systems, Inc., Fort Lauderdale, FL (US)

( * ) Notice: Subject to any disclaimer, the term of this patent is extended or adjusted under 35 U.S.C. 154(b) by 245 days.

(21) Appl. No.: 13/469,457

(22) Filed: May 11, 2012

(65) Prior Publication Data

US 2012/0290765 A1    Nov. 15, 2012

Related U.S. Application Data

(60) Provisional application No. 61/485,240, filed on May 12, 2011.

(51) Int. Cl.
*G06F 12/06* (2006.01)
*G06F 12/02* (2006.01)
*G06F 9/50* (2006.01)
*G06F 12/08* (2006.01)

(52) U.S. Cl.
CPC ............ *G06F 12/023* (2013.01); *G06F 9/5022* (2013.01); *G06F 9/5077* (2013.01); *G06F 12/08* (2013.01); *G06F 2212/1041* (2013.01); *G06F 2212/1048* (2013.01); *G06F 2212/151* (2013.01)

(58) Field of Classification Search
CPC ....................................................... G06F 12/08
USPC ................................................. 711/147, 170
See application file for complete search history.

(56) References Cited

U.S. PATENT DOCUMENTS

| 5,949,972 | A  | * | 9/1999 | Applegate ........................ 714/54 |
| 7,058,768 | B2 | * | 6/2006 | Willman et al. .............. 711/154 |
| 7,421,533 | B2 | * | 9/2008 | Zimmer et al. .................... 711/6 |
| 7,644,246 | B2 | * | 1/2010 | Peinado et al. ............... 711/163 |
| 7,702,843 | B1 | * | 4/2010 | Chen et al. ........................ 711/6 |
| 7,716,446 | B1 | * | 5/2010 | Chen et al. ..................... 711/170 |
| 8,095,931 | B1 |   | 1/2012 | Chen et al. |
| 8,359,451 | B2 |   | 1/2013 | Chen et al. |
| 8,484,405 | B2 |   | 7/2013 | Mashtizadeh et al. |
| 8,527,673 | B2 |   | 9/2013 | Mahalingam et al. |

(Continued)

OTHER PUBLICATIONS

Jacob Faber Kloster, Jesper Kristensen, Arne Mejlholm, On the Feasibility of Memory Sharing, Jun. 2006.*

(Continued)

*Primary Examiner* — Brian Peugh
*Assistant Examiner* — Alex Olson
(74) *Attorney, Agent, or Firm* — BainwoodHuang

(57) ABSTRACT

A technique reclaims memory pages in a virtualization platform. The technique involves receiving, by a virtual machine of the virtualization platform, an inflate command which directs a balloon driver of the virtual machine to inflate. The technique further involves issuing, by the virtual machine and in response to the inflate command, a sweep request to a hypervisor. The sweep request directs the hypervisor to (i) perform a scan of memory pages allocated to the virtual machine for a predetermined pattern of characters, (ii) deallocate memory pages having the predetermined pattern of characters from the virtual machine (e.g., zeroed pages), the de-allocated memory pages including super pages and regular pages, and (iii) update a list of memory page mappings to reflect the de-allocated memory pages. The technique further involves completing balloon driver inflation after the list of memory page mappings is updated.

20 Claims, 5 Drawing Sheets

(56) References Cited

U.S. PATENT DOCUMENTS

| | | |
|---|---|---|
| 8,549,518 B1 | 10/2013 | Aron et al. |
| 8,645,610 B2* | 2/2014 | Chang et al. ................ 711/5 |
| 2007/0136506 A1* | 6/2007 | Traut et al. ................ 711/6 |
| 2009/0313445 A1* | 12/2009 | Pandey et al. ................ 711/162 |
| 2010/0049899 A1* | 2/2010 | Subrahmanyam et al. ....... 711/6 |
| 2010/0332720 A1* | 12/2010 | Chang et al. ................ 711/6 |
| 2011/0320682 A1* | 12/2011 | McDougall et al. .......... 711/6 |
| 2012/0030406 A1* | 2/2012 | Chang et al. ................ 711/6 |
| 2012/0124270 A1* | 5/2012 | Weissman et al. ............ 711/6 |
| 2012/0233435 A1* | 9/2012 | Ben-Yehuda et al. ........ 711/170 |
| 2012/0239850 A1* | 9/2012 | Qiu et al. ................ 711/6 |
| 2013/0290641 A1* | 10/2013 | Corrie ................ 711/133 |

OTHER PUBLICATIONS

Alan Zeichick, Supersizing Java: Large Pages on the Opteron Processor, Part 1 Feb. 14, 2006, Supersizing Java: Large Pages on the Opteron Processor, Part 1 Feb. 14, 2006.*

* cited by examiner

RECLAIMING MEMORY PAGES IN A COMPUTING SYSTEM HOSTING A SET OF VIRTUAL MACHINES

CROSS REFERENCE TO RELATED APPLICATIONS

This application claims the benefit under 35 U.S.C. §119 (e) of U.S. Provisional Application Ser. No. 61/485,240 filed on May 12, 2011, entitled, "SYSTEMS AND METHODS FOR RECLAIMING ZEROED PAGES PRIOR TO MEMORY BALLOON INFLATION", the contents and teachings of which are hereby incorporated by reference in their entirety.

BACKGROUND

Efficient virtualization environments typically comprise virtual machine managers that redistribute memory resources without disrupting operation of virtual machines executing within the environment. Memory resource redistribution can include distributing memory resources amongst virtual machines executing within the virtualization environment, or distributing memory resources to new virtual machines provisioned within the virtualization environment. In some instances, a virtual memory manager may redistribute memory resources from virtual machines having sufficient memory resources to other virtual machines that are either non-responsive or excessively swapping pages.

One method of reclaiming memory resources from a virtual machine includes submitting an inflate instruction to a balloon driver of the virtual machine (e.g., by placing a value in a designated memory location which is periodically monitored). The balloon driver of the virtual machine responds to the inflate instruction by (i) requesting that the guest operating system of the virtual machine provide physical memory to the balloon driver and (ii) invoking a hypervisor procedure which de-allocates the provided physical memory from the virtual machine. Once the administrator has reclaimed enough physical memory, the administrator allocates that reclaimed physical memory to the other virtual machine.

There are deficiencies to the above-described conventional approach to reclaiming physical memory from a virtual machine. For example, when the balloon driver requests the guest operating system of the virtual machine to provide physical memory, the guest operating system typically provides only regular sized pages (i.e., standard 4 KB pages) rather than super pages (i.e., 2 MB pages) of physical memory. However, the goal may be to reclaim super pages from the virtual machine and then allocate those super pages to the other virtual machine. Although it may be possible to coalesce the regular sized pages provided by the guest operating system into super pages, the guest operating system would need to satisfy multiple requests for physical memory in order to provide enough regular sized pages (contiguous on super page boundaries) for a subsequent coalescing process to render a meaningful number of super pages, and such a process would be extremely burdensome and time consuming.

SUMMARY

An improved technique reclaims memory pages by sweeping super pages and regular pages having a predetermined pattern of characters (e.g., zeroed pages) from a virtual machine in response to an inflate command. This sweeping activity can be performed via a single pass through a physical memory table (e.g., a physical address to machine address or P2M table) for the virtual machine prior to inflation of a balloon driver. Such a sweep effectively and efficiently moves free super pages on super page boundaries to a super page heap, and free regular pages to a regular page heap. Furthermore, such operation minimizes the remaining work needed to be performed to complete a balloon driver inflation process (i.e., less work during a decrease reservation hypercall since most free memory pages have already been reclaimed).

One embodiment is directed to a method for reclaiming memory pages which is performed in a virtualization platform. The method includes receiving, by a virtual machine of the virtualization platform, an inflate command which directs a balloon driver of the virtual machine to inflate. The method further includes issuing, by the virtual machine and in response to the inflate command, a sweep request to a hypervisor. The sweep request directs the hypervisor to (i) perform a scan of memory pages allocated to the virtual machine for a predetermined pattern of characters, (ii) de-allocate memory pages having the predetermined pattern of characters from the virtual machine, the de-allocated memory pages including super pages and regular pages, and (iii) update a list of memory page mappings to reflect the de-allocated memory pages. The method further includes completing balloon driver inflation after the list of memory page mappings is updated.

In some arrangements, issuing the sweep request to the hypervisor includes directing the hypervisor to (i) scan memory pages allocated to the virtual machine for zeroed pages, and (ii) de-allocate memory pages which are zeroed pages from the virtual machine. In these arrangements, the predetermined pattern of characters is a pattern of zeroes which fills a memory page.

In some arrangements, the list of memory page mappings is a physical address to machine address (P2M) mapping table for the virtual machine. The P2M table includes a set of P2M entries. Each P2M entry is configured to map a physical memory page address to a real memory page address. In these arrangements, updating the list of memory page mappings includes, for each memory page that the hypervisor de-allocates from the virtual machine, replacing a real memory page address in a corresponding P2M entry of the P2M table with a populate-on-demand (PoD) identifier.

In some arrangements, scanning the memory pages allocated to the virtual machine for zeroed pages includes checking each memory page identified by the P2M table as to whether that memory page is a zeroed page.

In some arrangements, de-allocating the memory pages which are zeroed pages from the virtual machine includes (i) placing de-allocated memory pages, which form zeroed super pages on super page boundaries, on an available super page list, and (ii) placing de-allocated memory pages, which do not form zeroed super pages on super page boundaries, on an available regular page list.

In some arrangements, placing de-allocated memory pages, which form zeroed super pages on super page boundaries, on the available super page list includes placing zeroed 2 MB pages in a heap of free 2 MB pages. In some arrangements, placing de-allocated memory pages, which do not form zeroed super pages on super page boundaries, on the available regular page list includes placing zeroed 4 KB pages in a heap of free 4 KB pages. In some arrangements, each de-allocated memory page resides in only one of the heap of free 2 MB pages and the heap of free 4 KB pages (i.e., a de-allocated memory page cannot reside in both heaps at the same time).

In some arrangements, the inflate command includes a value, and completing balloon driver inflation after the list of memory page mappings is updated includes: (i) providing, by a balloon driver of the virtual machine, a memory request to a guest operating system of the virtual machine, the memory request requesting an amount of memory based on the value of the inflate command, and (ii) receiving an array of allocated pages from the guest operating system in response to the memory request.

In some arrangements, completing balloon driver inflation after the list of memory page mappings is updated further includes issuing, by the balloon driver, a decrease reservation hypercall to the hypervisor, the decrease reservation hypercall directing the hypervisor to process the array of allocated pages.

In some arrangements, the array of allocated pages includes a set of allocated page entries. Each allocated page entry is configured to map a physical memory page address to a real memory page address. In these arrangements, processing the array of allocated pages includes, for each allocated page entry of the array of allocated pages:
  (i) when the allocated page entry identifies a real memory page, placing the real memory page on an available page list and replacing a real memory page address of the allocated page entry with an invalid entry identifier to indicate that the allocate page entry no longer identifies a real memory page, and
  (ii) when the allocated page entry includes a populate-on-demand identifier, replacing the populate-on-demand identifier with the invalid entry identifier.

In some arrangements, the method further comprises allocating, after the hypervisor has attended to the sweep request, super pages reclaimed from the virtual machine of the virtualization platform to another virtual machine of the virtualization platform.

In some arrangements, allocating the super pages reclaimed from the virtual machine includes assigning the super pages to a second virtual machine which is created after the super pages are reclaimed.

In some arrangements, allocating the super pages reclaimed from the virtual machine includes assigning the super pages to a second virtual machine which was created prior to reclaiming the super pages.

Another embodiment is directed to a computing system which includes physical memory, and a physical processor coupled to the physical memory, the physical processor executing the hypervisor to form a virtualization platform. Here, a virtual machine of the virtualization platform is constructed and arranged to receive an inflate command which directs a balloon driver of the virtual machine to inflate, and issue a sweep request to the hypervisor in response to the inflate command. The sweep request directs the hypervisor to (i) perform a scan of memory pages of the physical memory which are allocated to the virtual machine for a predetermined pattern of characters, (ii) de-allocate memory pages having the predetermined pattern of characters from the virtual machine, the de-allocated memory pages including super pages and regular pages, and (iii) update a list of memory page mappings to reflect the de-allocated memory pages. The virtual machine of the virtualization platform is further constructed and arranged to complete balloon driver inflation after the list of memory page mappings is updated.

Other embodiments are directed to computing systems, computing platforms, computer program products, and so on. Some embodiments are directed to various methods, electronic components and circuits which are involved in reclaiming memory pages which is performed in a virtualization platform.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

An improved technique reclaims memory pages in a computing system which hosts a set of virtual machines. The technique involves sweeping super pages and regular pages having a predetermined pattern of characters (e.g., zeroed pages) from a virtual machine in response to an inflate command. This sweeping activity can be performed via a single pass through a physical memory table (e.g., physical address to machine address or P2M table) for the virtual machine prior to inflation of a balloon driver. Such a sweep effectively and efficiently moves free super pages on super page boundaries to a heap of free super pages, and free regular pages to a heap of free regular pages. Additionally, such operation minimizes the remaining work needed to be performed to complete a balloon driver inflation process (i.e., less work during a decrease reservation hypercall since most free memory pages have already been reclaimed).

Figure 1:
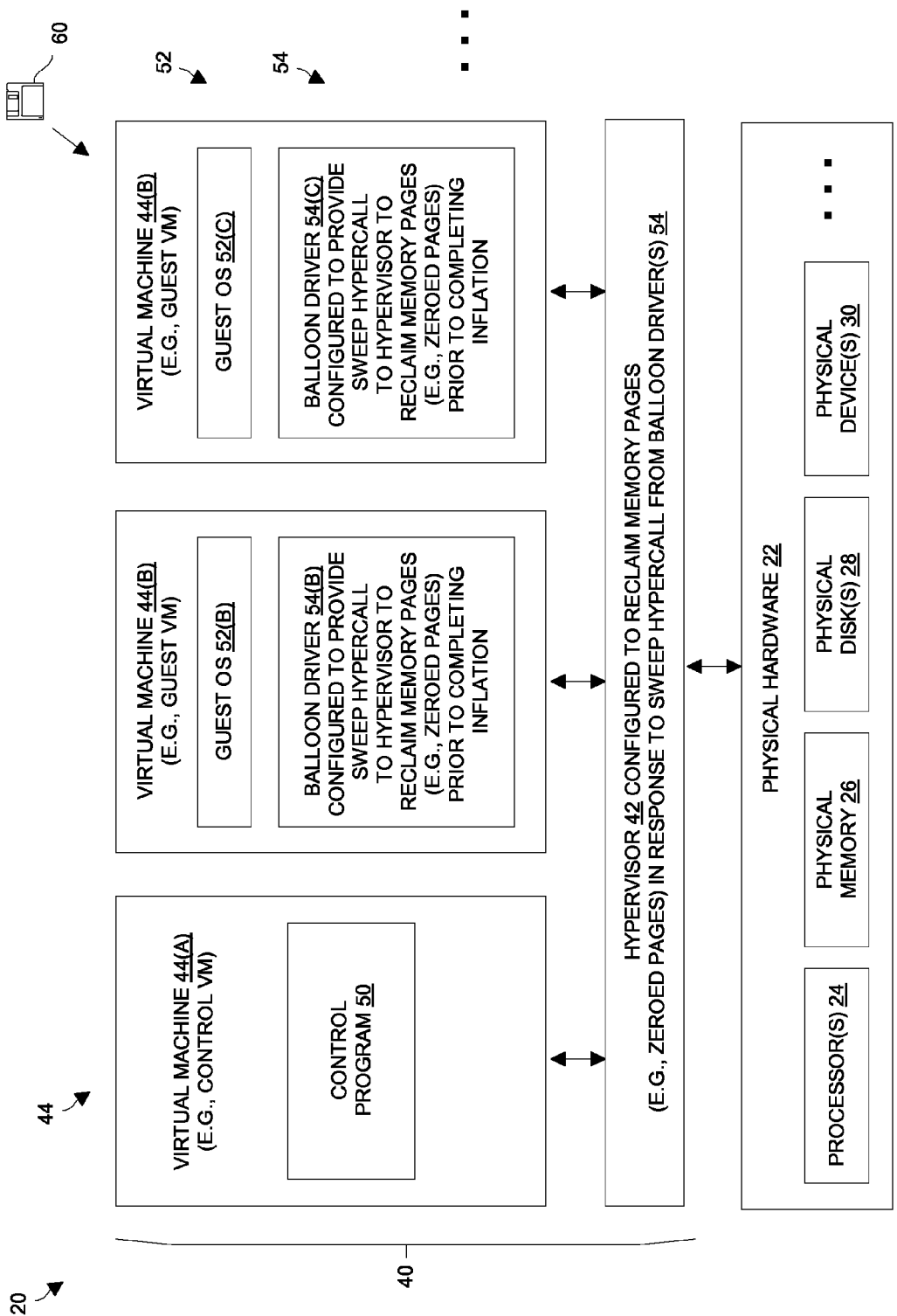
FIG. 1 is a block diagram of a computing system which is constructed and arranged to reclaim memory pages by sweeping zeroed super pages and zeroed regular pages from a virtual machine prior to inflation of a balloon driver.

FIG. 1 shows a computing system 20 which reclaims memory pages by sweeping super pages and regular pages from a virtual machine prior to inflation of a balloon driver. The computing system 20 includes physical hardware 22 such as a set of processors 24 (one or more microprocessors, processing modules, microprocessor chip sets, etc.), physical memory 26 (e.g., high speed semiconductor memory), physical disks 28 (e.g., magnetic disk drives, optical disk drives, etc.) and other physical devices and circuits 30 (e.g., a network interface, a graphics processing unit, etc.). The computer device 20 may include other hardware as well such as printers, displays, and so on.

Operating within the computing system 20 are a variety of software-based constructs 40 including a hypervisor 42 and a set of virtual machines 44(A), 44(B), 44(C), . . . (collectively, virtual machines 44). In one arrangement, the hypervisor 42 is in the form of a type I (or "bare-metal" type) hypervisor which runs without need of a separate host operating system. In another arrangement, the hypervisor 42 is in the form of a type 2 hypervisor which operates in combination with a separate host operating system.

The virtual machine 44(A) is configured as a control virtual machine (or control VM), and the remaining virtual machines 44(B), 44(C), . . . are configured as guest virtual machines (or guest VMs). Along these lines, the virtual machine 44(A) is equipped with a control program 50 which enables the virtual machine 44(A) to impart overall control over the computing system 20. Additionally, the other virtual machines 44(B), 44(C), . . . are equipped with respective guest operating systems 52(B), 52(C), . . . (collectively, guest operating systems 52) and respective balloon drivers 54(B), 54(C), . . . (collectively, balloon drivers 54).

During operation, the control VM is capable of taking direction from a user and, under such direction, setting and/or changing various operating parameters within the computing system 20. In particular, the control VM provides the user with the ability to create and/or remove guest VMs. Additionally, the control VM allows the user to adjust various operating parameters of the guest VMs. For example, the control VM is capable of setting and/or adjusting the particular amount of physical memory 26 allocated to each of the guest VMs. With the hypervisor 42 and VMs 44 running on the computing system 20, a robust and reliable virtualization platform is available on which to perform useful work.

During such operation, the various software constructs 40 are able to selectively reclaim and reallocate both super pages and regular pages of physical memory 26. In particular, the balloon driver 54 of each guest VM is capable of receiving an inflate command from the control VM and, in turn, issuing a sweep request to the hypervisor 42 prior to inflation. The sweep request directs the hypervisor 42 to (i) perform a scan of memory pages allocated to that guest VM for a predetermined pattern of characters (e.g., zeroed pages), (ii) de-allocate memory pages having the predetermined pattern of characters from that guest VM, the de-allocated memory pages including super pages and regular pages, and (iii) update a list of memory page mappings (e.g., a P2M mapping table for the guest VM) to reflect the de-allocated memory pages. After the list of memory page mappings is updated, the balloon driver 54 of that guest VM completes balloon driver inflation (e.g., requests memory from the guest OS 52 of that guest VM and makes a "decrease reservation" hypercall).

It should be understood that one or more of the software-based constructs 40 are deliverable to the computing system 20 via a computer program product 60 which stores instructions (e.g., executable code, interpretable code, combinations thereof, etc.). In particular, the computer program product 60 includes a non-transitory computer readable storage medium that stores a set of instructions which, when performed by the computing system 20, cause the computing system 20 to perform various enhanced operations. Suitable forms for such a non-transitory computer readable storage medium which delivers such instructions in a non-volatile manner include CD-ROMs, DVDs, disk memory, tape memory, flash memory, and the like.

Figure 2:
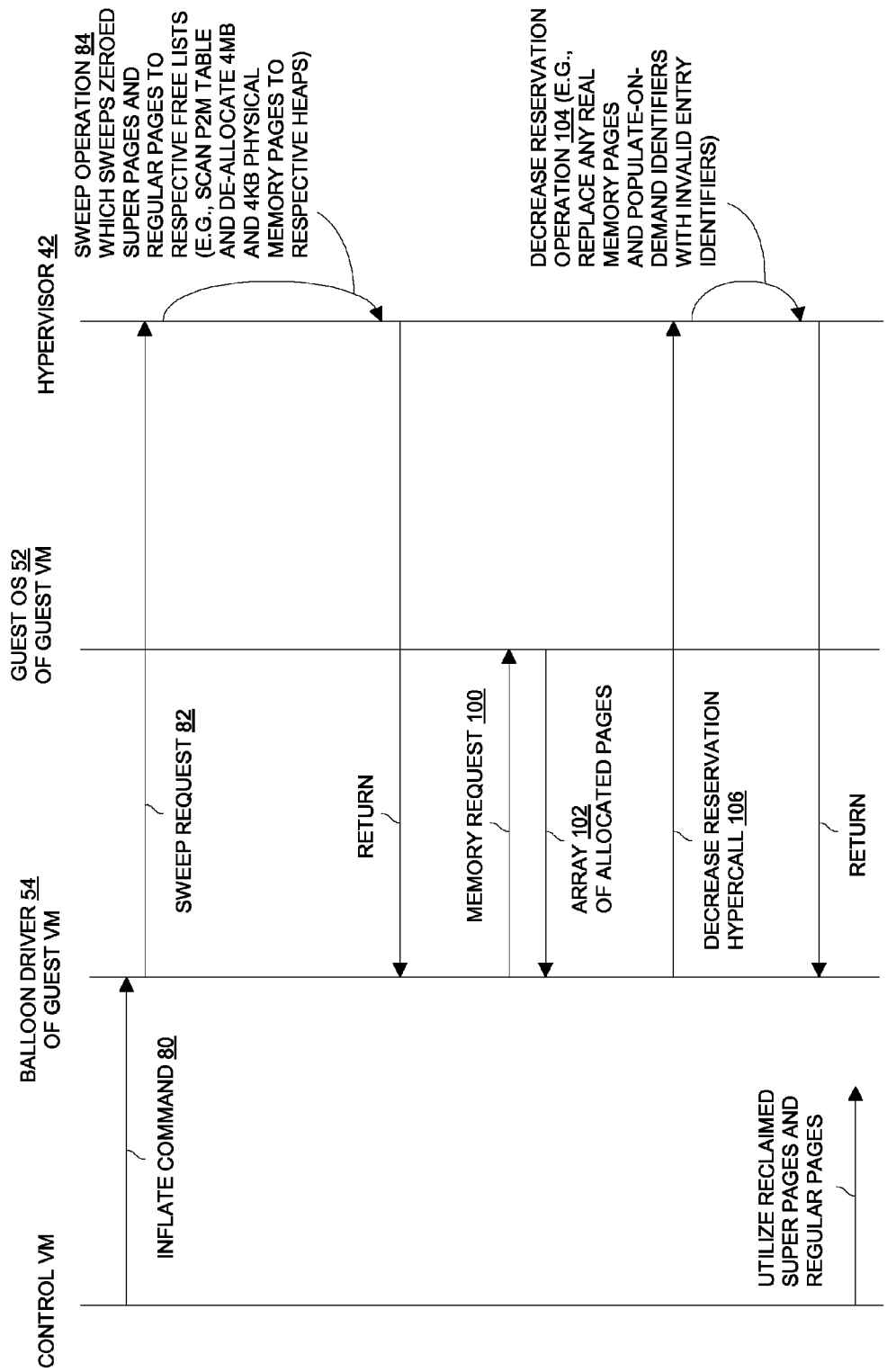
FIG. 2 is a sequence diagram illustrating particular operating details of the computing system.
Figure 3:
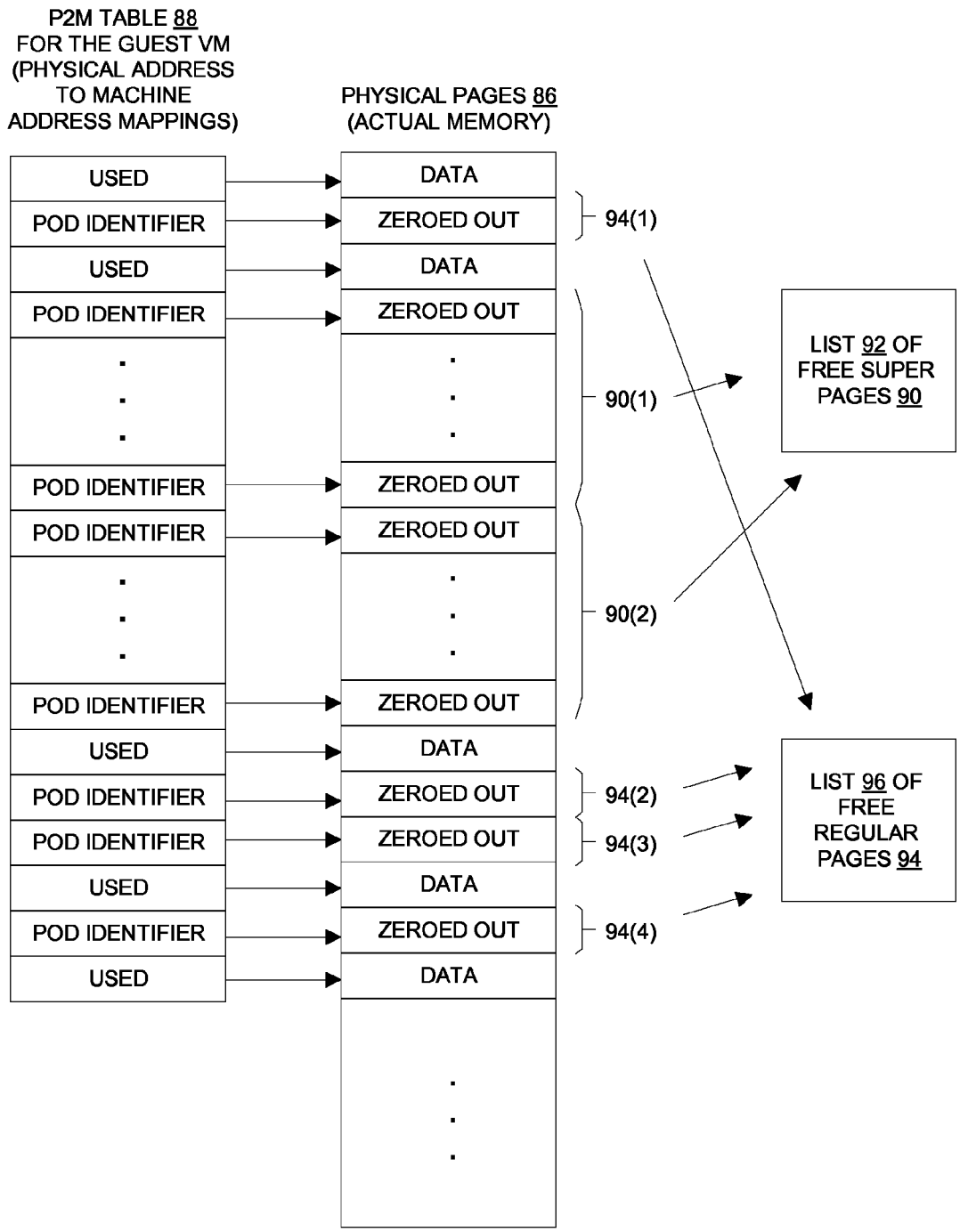
FIG. 3 is a block diagram of particular computing system components which are involved in reclaiming memory pages.

Further details will now be provided with reference to FIGS. 2 and 3. FIG. 2 is a sequence diagram illustrating particular operating details of the computing system 20. FIG. 3 is a block diagram showing particular details of a sweep operation.

To reclaim memory pages, the control VM provides an inflate command 80 to the balloon driver 54 of the guest VM from which memory pages are to be reclaimed. In some arrangements, the control VM writes a value to a designated location in memory, and the balloon driver 54 is configured to periodically check that memory location and inflate (or deflate) in response to a change in that value.

In response to the inflate command 80, the balloon driver 54 of the guest VM issues a sweep request 82 to the hypervisor 42. The sweep request 82 directs the hypervisor 42 to perform a sweep operation 84 which sweeps zeroed memory pages of the guest VM (i.e., memory pages which are filled with zeroes) back to free page lists. In some arrangements, the sweep request 82 is implemented as a hypercall to the hypervisor 42.

In response to the sweep request 82, the hypervisor 42 performs the sweep operation 84 by sweeping zeroed super pages to a free super page heap (i.e., free 2 MB pages), and regular pages to a free regular page heap (i.e., free 4 KB pages). In particular and as illustrated in FIG. 3, the hypervisor 42 performs a scan of the memory pages 86 allocated to the guest VM by checking each memory page 86 identified by a P2M table 88 for the guest VM as to whether that memory page 86 is a zeroed page. The hypervisor 42 places memory pages 86, which form zeroed super pages 90 on super page boundaries, on a list 92 of free super pages 90 (see zeroed out super pages 90(1), 90(2) in FIG. 3). Additionally, the hypervisor 42 places memory pages 86, which do not form zeroed super pages on super page boundaries but which are simply zeroed regular pages 94, on a list 96 of free regular pages 94 (see zeroed out regular pages 94(1), 94(2), 94(3), and 94(4) in FIG. 3).

As the hypervisor 42 sweeps up these zeroed pages 90, 94, the hypervisor 42 updates the P2M table 88 to reflect the de-allocated memory pages 86. In particular, as shown in FIG. 3, the hypervisor 42 replaces the machine addresses in the P2M entries that point to the zeroed pages 90, 94 with standard populate-on-demand (POD) identifiers (i.e., a special value).

With reference back to FIG. 2, control returns to the balloon driver 54 once the sweep operation 84 has completed. It should be understood that, at this point, the zeroed super pages 90 on super page boundaries have been swept from the guest VM onto the available free super page list 92. Likewise, the remaining zeroed regular pages 94 have been swept from the guest VM onto the available free regular page list 96.

The balloon driver 54 is now ready to complete the inflation process. In particular, the balloon driver 54 provides a memory request 100 to the guest operating system 52 of the guest VM. The amount of memory requested may be based on the value provided to the balloon driver 54 in the inflate command 80. In response to the memory request 100, the guest operating system 52 provides an array 102 of allocated memory pages back to the balloon driver 54.

Upon receipt of the array 102 of allocated memory pages, the balloon driver 54 of the guest VM makes a decrease reservation hypercall 106. In response to the decrease reservation hypercall 106, the hypervisor 42 performs a decrease reservation operation 104. In particular, for each allocated memory page in the array 102, the hypervisor 42 inspects the corresponding P2M entry in the P2M table 88 for the guest VM (also see FIG. 3). When the corresponding P2M entry identifies a real memory page, the hypervisor 42 places the real memory page on an available page list (e.g., see the list 96 of free regular pages 94 in FIG. 3), and replaces the real memory page address in that P2M entry with an invalid entry identifier (i.e., INVALID) to indicate that the P2M entry no longer identifies a real memory page. However, when the corresponding P2M entry includes a POD identifier rather than a real memory page address, the hypervisor 42 simply replaces the POD identifier with the INVALID identifier.

When the decrease reservation operation 104 is finished, the balloon driver 54 of the guest VM has completed inflation. At this point, the balloon driver 54 can return to sleep. Furthermore, the control VM, which is capable of monitoring the available memory status of the computing system 20 (e.g., by scanning the lists 92, 96, also see FIG. 3), is now able to utilize the reclaimed zeroed super pages 90 and reclaimed zeroed regular pages 94. Along these lines, the control VM is capable of assigning these pages 92, 96 to a newly created virtual machine 44 or another existing virtual machine 44.

Figure 4:
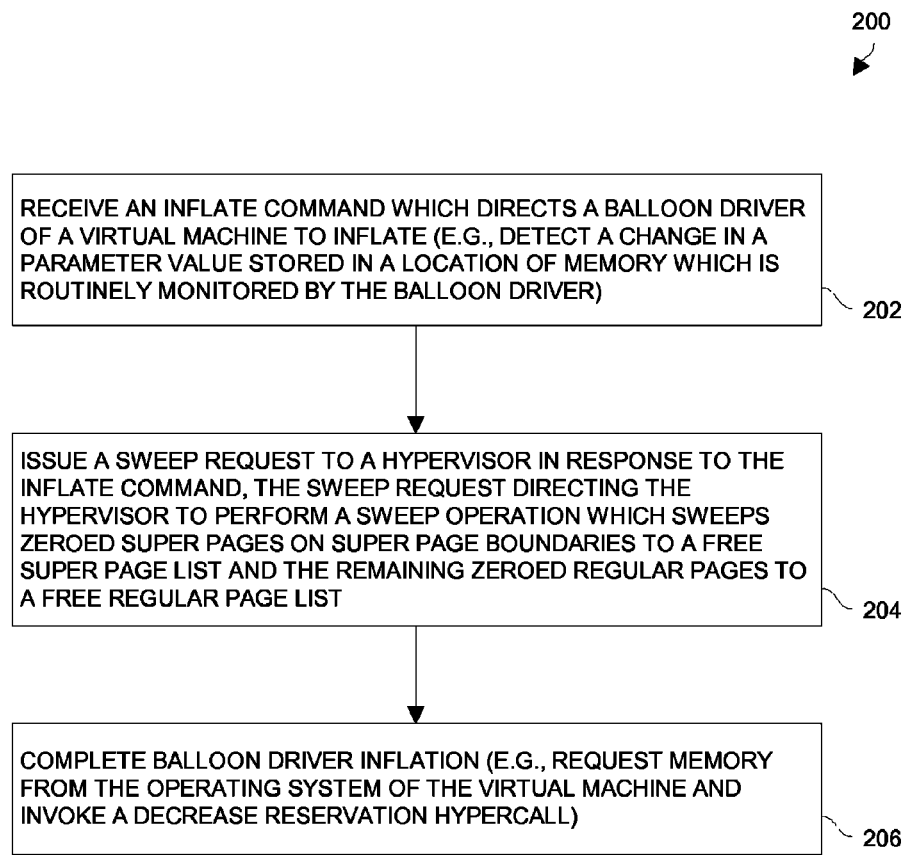
FIG. 4 is a flowchart of a procedure which is performed by the computing system when reclaiming memory pages.
Figure 5:
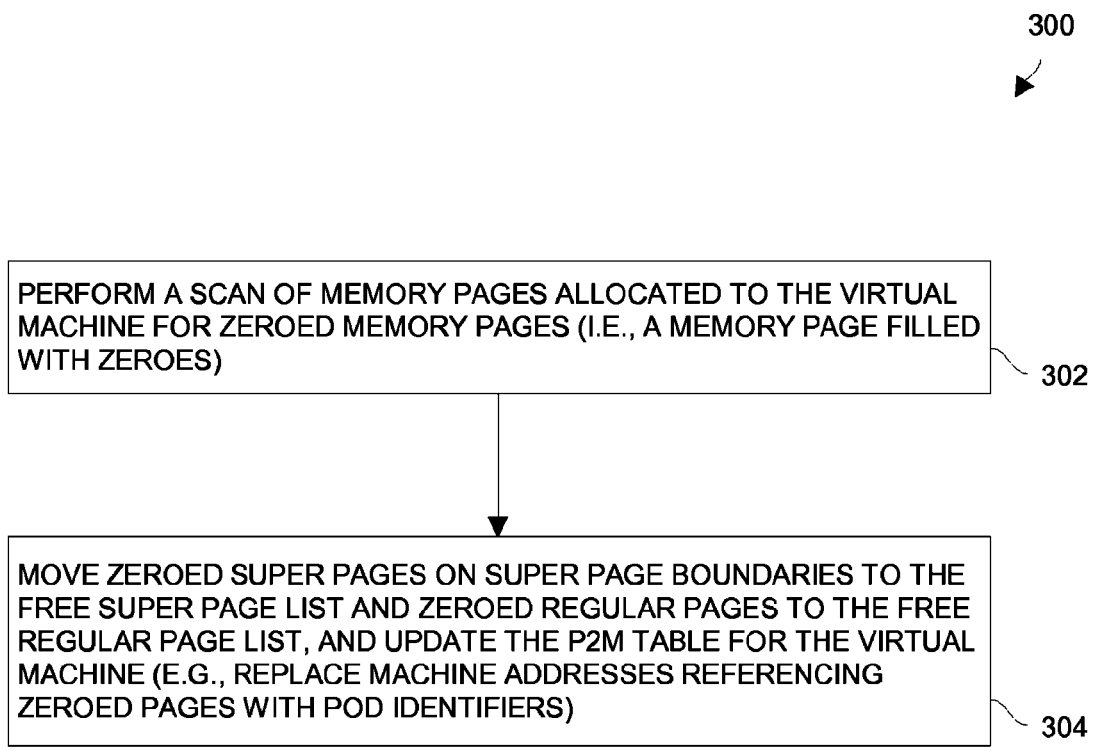
FIG. 5 is a flowchart of a particular operation of the computing system when reclaiming memory pages.

Further details will now be provided with reference to FIGS. 4 and 5. FIG. 4 is a flowchart of a procedure 200 which is performed by a virtual machine 44 of the computing system 20 when reclaiming memory pages. FIG. 5 is a flowchart of a procedure 300 for performing a sweep operation 84 to reclaim the memory pages.

With reference to step 202 in FIG. 4, the virtual machine 44 receives an inflate command 80 which directs a balloon driver 54 of the virtual machine 20 to inflate (also see FIG. 2). In some arrangements, the inflate command 80 is received as a change in a parameter value stored in a location of memory which is routinely monitored by the balloon driver 54.

In step 204 in FIG. 4, the virtual machine 44 issues a sweep request 82 to the hypervisor 42 in response to the inflate command 80. The sweep request 82 directs the hypervisor 42 to perform a sweep operation 84 (FIG. 2) which sweeps zeroed super pages 90 to a free super page list 92 and zeroed regular pages 94 to a free regular page list 96 (FIG. 3).

In step 206 in FIG. 4, at the completion of the sweep operation 84, the virtual machine 44 completes balloon driver inflation. In particular, the balloon driver 54 (i) requests memory from the operating system 52 of the virtual machine 44 and (ii) invokes a decrease reservation hypercall which directs the hypervisor 42 to perform a decrease reservation operation 104 (also see FIG. 2).

Once the zeroed super pages 90 and zeroed regular pages 94 have been reclaimed, these memory pages 90, 96 (FIG. 3) are available for reuse within the computer system 20. For instance, the control VM 44(A) (FIG. 1) may allocate at least some of the reclaimed memory pages 90, 96 to another virtual machine 44 to a newly created virtual machine 44.

Particular details of the procedure 300 for performing the sweep operation 84 are shown in FIG. 5. This sweep operation 84 takes place when the balloon driver 54 of a virtual machine 44 sends a sweep request 82 to the hypervisor 42 (also see FIG. 2).

In step 302, the hypervisor 42 performs a scan of memory pages allocated to the virtual machine 44 zeroed memory pages 86. In particular, the hypervisor 42 checks each memory page 86 identified by the P2M table 88 for the virtual machine 44 as to whether that memory page 86 is a zeroed page (i.e., filled with a pattern of zeroes). If the hypervisor 42 discovers a contiguous series of zeroed memory pages 86 which forms a zeroed super page 90 on a super page boundary, the hypervisor 42 moves that zeroed super page 90 to the free super page list 92 (FIG. 3), and updates the P2M entries of the P2M table 88 by replacing the actual machine addresses in the corresponding P2M entries with POD identifiers. However, if the hypervisor 42 discovers a zeroed memory page 90 which is not part of a zeroed super page on a super page boundary, the hypervisor 42 moves that zeroed memory page 90 to the available regular page list 96 and replaces the actual machine address in the corresponding P2M entry with a POD identifier. Accordingly, the hypervisor 42 is able to effectively reclaim zeroed super pages 90 and zeroed regular pages 94 in a single pass of the P2M table 88.

As mentioned above, an improved technique reclaims memory pages by sweeping super pages and regular pages having a predetermined pattern of characters (e.g., zeroed pages) from a virtual machine 44 in response to an inflate command 80. This sweeping activity can be performed via a single pass through a P2M table 88 for the virtual machine 44 prior to inflation of a balloon driver 54. Such a sweep effectively and efficiently moves free super pages 90 on super page boundaries to a super page heap 92, and free regular pages 94 to a regular page heap 96. Furthermore, such operation minimizes the remaining work needed to be performed to complete a balloon driver inflation process (i.e., less work during a decrease reservation hypercall since most free memory pages have already been reclaimed).

While various embodiments of the present disclosure have been particularly shown and described, it will be understood by those skilled in the art that various changes in form and details may be made therein without departing from the spirit and scope of the present disclosure as defined by the appended claims.

For example, super pages were described above as being 2 MBs in size, and regular pages were described above as being 4 KBs in size by way of example only. In other arrangements, the size of super pages is different (e.g., 1 MB, 4 MB, etc.). Similarly, in other arrangements, the size of regular pages is different (e.g., 1 KB, 2 KB, 8 KB, etc.).

Additionally, it should be understood that various operations described above as being performed by the balloon driver 54 of a guest VM can be performed by other components of the computing system 20. For example, such operations can be performed by a guest VM driver which is different than the balloon driver 54, by the guest OS of the guest VM, by the control VM, by the hypervisor 42, etc.

Furthermore, it should be understood that the sweep operation 84 and the decrease reservation operation 104 (also see FIG. 2) were described above as being implemented as hypercalls. In other arrangements, the sweep operation 84 and the decrease reservation operation 104 are implemented differently (e.g., by the control VM, by a dedicated VM, and so on).

What is claimed is:

1. In a virtualization platform, a method for reclaiming memory pages, the method comprising:
    receiving, by a virtual machine of the virtualization platform, an inflate command which directs a balloon driver of the virtual machine to inflate;
    issuing, by the virtual machine and in response to the inflate command, a sweep request to a hypervisor,
    wherein the sweep request directs the hypervisor to (i) perform a scan of memory pages allocated to the virtual machine for a predetermined pattern of characters, (ii) de-allocate memory pages having the predetermined pattern of characters from the virtual machine, the de-allocated memory pages including super pages and regular pages, and (iii) update a list of memory page mappings to reflect the de-allocated memory pages; and
    after the list of memory page mappings is updated, completing balloon driver inflation,
    wherein issuing the sweep request to the hypervisor includes directing the hypervisor to (i) scan memory pages allocated to the virtual machine for zeroed pages, and (ii) de-allocate memory pages which are zeroed pages from the virtual machine,
    wherein the list of memory page mappings is a physical address to machine address (P2M) table for the virtual machine, the P2M table including a set of P2M entries, each P2M entry being configured to map a physical memory page address to a real memory page address; and
    wherein updating the list of memory page mappings includes:

for each memory page that the hypervisor de-allocates from the virtual machine, replacing a real memory page address in a corresponding P2M entry of the P2M table with a populate-on-demand identifier.

2. A method as in claim 1 wherein scanning the memory pages allocated to the virtual machine for zeroed pages includes:
checking each memory page identified by the P2M table as to whether that memory page is a zeroed page.

3. A method as in claim 1 wherein de-allocating the memory pages which are zeroed pages from the virtual machine includes:
placing de-allocated memory pages, which form zeroed super pages on super page boundaries, on an available super page list; and
placing de-allocated memory pages, which do not form zeroed super pages on super page boundaries, on an available regular page list.

4. A method as in claim 3 wherein placing de-allocated memory pages, which form zeroed super pages on super page boundaries, on the available super page list includes:
placing zeroed 2 MB pages in a heap of free 2 MB pages.

5. A method as in claim 3 wherein placing de-allocated memory pages, which do not form zeroed super pages on super page boundaries, on the available regular page list includes:
placing zeroed 4 KB pages in a heap of free 4 KB pages.

6. A method as in claim 3 wherein placing de-allocated memory pages, which form zeroed super pages on super page boundaries, on the available super page list includes:
placing zeroed 2 MB pages in a heap of free 2 MB pages;
wherein placing de-allocated memory pages, which do not form zeroed super pages on super page boundaries, on the available regular page list includes:
placing zeroed 4 KB pages in a heap of free 4 KB pages; and
wherein each de-allocated memory page resides in only one of the heap of free 2 MB pages and the heap of free 4 KB pages.

7. A method as in claim 1 wherein the inflate command includes a value; and wherein completing balloon driver inflation after the list of memory page mappings is updated includes:
providing, by a balloon driver of the virtual machine, a memory request to a guest operating system of the virtual machine, the memory request requesting an amount of memory based on the value of the inflate command, and
receiving an array of allocated pages from the guest operating system in response to the memory request.

8. A method as in claim 7 wherein completing balloon driver inflation after the list of memory page mappings is updated further includes:
issuing, by the balloon driver, a decrease reservation hypercall to the hypervisor, the decrease reservation hypercall directing the hypervisor to process the array of allocated pages.

9. A method as in claim 8 wherein the array of allocated pages includes a set of allocated page entries, each allocated page entry being configured to map a physical memory page address to a real memory page address; and wherein processing the array of allocated pages includes:
for each allocated page entry of the array of allocated pages:
when the allocated page entry identifies a real memory page, placing the real memory page on an available page list and replacing a real memory page address of the allocated page entry with an invalid entry identifier to indicate that the allocate page entry no longer identifies a real memory page, and
when the allocated page entry includes a populate-on-demand identifier, replacing the populate-on-demand identifier with the invalid entry identifier.

10. A method as in claim 1, further comprising:
after the hypervisor has attended to the sweep request, allocating super pages reclaimed from the virtual machine of the virtualization platform to another virtual machine of the virtualization platform.

11. A method as in claim 10 wherein allocating the super pages reclaimed from the virtual machine includes:
assigning the super pages to a second virtual machine which is created after the super pages are reclaimed.

12. A method as in claim 10 wherein allocating the super pages reclaimed from the virtual machine includes:
assigning the super pages to a second virtual machine which was created prior to reclaiming the super pages.

13. A method as in claim 1, wherein de-allocating the memory pages which are zeroed pages from the virtual machine includes (i) placing all de-allocated memory pages that form zeroed super pages on super page boundaries on an available super page list and (ii) placing only those de-allocated memory pages that do not form zeroed super pages on super page boundaries on the available regular page list.

14. A method as in claim 1, wherein directing, in response to the sweep request, the hypervisor to (i) perform the scan of memory pages allocated to the virtual machine for the predetermined pattern of characters, (ii) de-allocate memory pages having the predetermined pattern of characters from the virtual machine and (iii) update the list of memory page mappings to reflect the de-allocated memory pages is performed in a single pass through the list of memory page mappings.

15. The method of claim 1, wherein, each populate-on-demand (POD) identifier identifies a memory page that has already been placed on a set of available page lists to facilitate subsequent requests for free pages.

16. The method of claim 15, further comprising:
the hypervisor receiving a decrease reservation hypercall from the balloon driver, the decrease reservation hypercall identifying an array of allocated memory pages;
for each of the memory pages in the array of allocated memory pages, inspecting a P2M entry in the P2M table for the respective memory page; and
for each inspected P2M entry that indicates a POD identifier for the respective physical memory page, replacing the POD identifier with an INVALID identifier, the memory page already having been placed on one of the set of available page lists.

17. The method of claim 16, further comprising, for each of the memory pages in the array of allocated memory pages for which the P2M table does not indicate a POD identifier for the physical memory page:
placing the page on one of the set of available page lists; and
replacing the physical memory page address with an INVALID identifier.

18. A computer program product including a non-transitory computer-readable storage medium that stores a set of instructions, which, when performed by a computing system, cause the computing system to perform a method for reclaiming memory pages in a virtualization environment, the method comprising:
receiving, by a virtual machine of the virtualization platform, an inflate command which directs a balloon driver of the virtual machine to inflate;

issuing, by the virtual machine and in response to the inflate command, a sweep request to a hypervisor, wherein the sweep request directs the hypervisor to (i) perform a scan of memory pages allocated to the virtual machine for a predetermined pattern of characters, (ii) de-allocate memory pages having the predetermined pattern of characters from the virtual machine, the de-allocated memory pages including super pages and regular pages, and (iii) update a list of memory page mappings to reflect the de-allocated memory pages; and after the list of memory page mappings is updated, completing balloon driver inflation, wherein issuing the sweep request to the hypervisor includes directing the hypervisor to (i) scan memory pages allocated to the virtual machine for zeroed pages, and (ii) de-allocate memory pages which are zeroed pages from the virtual machine, wherein the list of memory page mappings is a physical address to machine address (P2M) table for the virtual machine, the P2M table including a set of P2M entries, each P2M entry being configured to map a physical memory page address to a real memory page address; and wherein updating the list of memory page mappings includes:

for each memory page that the hypervisor de-allocates from the virtual machine, replacing a real memory page address in a corresponding P2M entry of the P2M table with a populate-on-demand identifier.

19. In a virtualization platform, a method for reclaiming memory pages, the method comprising:

receiving, by a virtual machine of the virtualization platform, an inflate command which directs a balloon driver of the virtual machine to inflate;

issuing, by the balloon driver of the virtual machine and in response to the inflate command, a first request to a hypervisor, the first request directing the hypervisor to (i) perform a scan of memory pages allocated to the virtual machine for a predetermined pattern of characters, (ii) de-allocate memory pages having the predetermined pattern of characters from the virtual machine, the de-allocated memory pages including super pages and regular pages, and (iii) update a physical address to machine address (P2M) table for the virtual machine to reflect the de-allocated memory pages, the P2M table including a set of P2M entries each mapping a physical memory page address to a real memory page address, wherein updating the list of memory page mappings includes, for each memory page that the hypervisor de-allocates from the virtual machine, replacing a real memory page address in a corresponding P2M entry of the P2M table with a populate-on-demand (POD) identifier, each POD identifier indicating that the respective memory page has been placed on one of a set of available page lists;

after the list of memory page mappings has been updated, the hypervisor receiving a second request from the balloon driver, the second request identifying a set of allocated memory pages; and in response to the hypervisor receiving the second request, (i) inspecting a P2M entry in the P2M table for each of the memory pages in the set of allocated memory pages, and (ii) for each inspected P2M entry that indicates a POD identifier for the respective memory page, replacing the POD identifier with an INVALID identifier, the memory page thus being available from one of the set of available page lists without placing the memory page on any of the set of available page lists in response to the second request.

20. The method of claim 19, wherein the first request is a sweep request and the second request is a decrease reservation hypercall.

* * * * *